United States Patent [19]

Hirsch

[11] Patent Number: 5,432,862
[45] Date of Patent: * Jul. 11, 1995

[54] FREQUENCY DIVISION, ENERGY COMPARISON, SOURCE DETECTION SIGNAL PROCESSING SYSTEM

[75] Inventor: Peter Hirsch, Denville, N.J.

[73] Assignee: Visidyne, Inc., Parsipanny, N.J.

[*] Notice: The portion of the term of this patent subsequent to Jun. 2, 2009 has been disclaimed.

[21] Appl. No.: 33,276

[22] Filed: Mar. 16, 1993

Related U.S. Application Data

[63] Continuation-in-part of Ser. No. 712,973, Jun. 10, 1991, Pat. No. 5,261,007, which is a continuation-in-part of Ser. No. 611,935, Nov. 9, 1990, Pat. No. 5,119,432.

[51] Int. Cl.[6] .......................... G06K 9/00; G10L 5/00
[52] U.S. Cl. ..................................... 382/207; 73/648; 364/484; 381/45; 382/191
[58] Field of Search ................. 382/1, 17, 29; 73/648; 364/484, 485; 381/45; 367/32, 43, 49

[56] References Cited

U.S. PATENT DOCUMENTS 4,383,135  5/1983  Scott et al. ............................ 381/45
5,119,432  6/1992  Hirsch .................................... 382/1
5,261,007  11/1993  Hirsch .................................... 382/1

Primary Examiner—Leo H. Boudreau
Attorney, Agent, or Firm—Iandiorio & Teska

[57] ABSTRACT

A frequency division, energy comparison, source detection signal processing system which decomposes a wide-band signal into a plurality of narrow frequency band components, generates the energy envelope of each of those narrow band components, determines the envelope correlation coefficients, and detects the presence of a source contributing to the wide-band signal from the correlation coefficients.

2 Claims, 3 Drawing Sheets

FREQUENCY DIVISION, ENERGY COMPARISON, SOURCE DETECTION SIGNAL PROCESSING SYSTEM

RELATED APPLICATION

This application is a continuation-in-part application of application Ser. No. 07/712,973 filed Jun. 10, 1991, now U.S. Pat. No. 5,261,007, which is itself a continuation-in-part of application Ser. No. 07/611,935 filed Nov. 9, 1990 which issued as U.S. Pat. No. 5,119,432.

FIELD OF INVENTION

This invention relates to a frequency division, energy comparison, source detection signal processing system that is a more sensitive source detection system.

BACKGROUND OF INVENTION

There are many situations in which it is desirable to detect changes in broad band energy sources. For example, it is sometimes desirable to detect changes in the sound output of an operating machine that may be indicative of a problem, or of a condition being monitored. It is also desirable to detect, localize and classify long range contacts or sources of sound in passive surveillance of the sub-surface ocean. Currently, such information is discerned using two or more physically spaced, non-directional or directional receivers.

In the non-directional receiver case: one of the received signals is delayed by a variable amount, then correlated with the signal from the other receiver. The presence and direction of a source are then apparent from a peak in the correlation coefficient at the value of delay which corresponds to the difference in propagation time of the sound from the source to the two receivers. For example, when the difference is zero, then the source must lie in a line which is perpendicular to the line joining the two receivers. If the difference is non-zero, then the source must be on a hyperbola, the exact location of which depends on the delay difference, the distance between the receivers, and the speed of propagation. The disadvantage of this method is that it uses non-directional receivers, which are inherently incapable of discriminating against noise arriving from directions other than the source direction, and which therefore suffer a degraded ability to detect weak sources.

This disadvantage may be partially overcome by using directional receivers, and scanning them both in azimuth. Consider the distance apart of the two receivers and the distance to the source; if the receiver separation is large compared to the range of the source, then the azimuths from the source to the two receivers have no predictable relationship, and the signals from all possible azimuth pairs must be correlated to find a source at an arbitrary position. The disadvantage of this approach is the cost of the large number of correlations that are required.

Alternatively, the directional receivers may be spaced sufficiently closely that the azimuths from the source to the receivers are essentially equal. Then the number of required correlations is greatly reduced. However, the proximity of the two receivers brings with it a greater probability that the received noises—as well as the source signals—are correlated, leading again to degraded ability to detect weak sources.

SUMMARY OF INVENTION

It is therefore an object of this invention to provide a frequency division, energy comparison signal processing system which can detect the presence of a wide-band signal in wide band noise using only a single directional or non-directional receiver.

It is a further object of this invention to provide such a frequency division, energy comparison, source detection signal processing system that has increased sensitivity over a known directional receivers.

It is a further object of this invention to provide such a system which has a greater signal to noise ratio than known directional receivers.

It is a further object of this invention to provide such a system which is capable of detecting undersea contacts.

This invention results from the realization that a wide band sound source detection system having an increased signal to noise ratio may be accomplished by correlating the energy envelopes of a number of narrow frequency band components of the wide band source, averaging the correlation coefficients, and thresholding the average so that all of the receiver elements of a directional receiver array may be used for detection of a signal source.

This invention features a frequency division, energy comparison, source detection signal processing system, comprising means for decomposing a wide-band signal into a plurality of more narrow frequency band components, means for generating the energy envelope of at least some of the more narrow frequency band components, means for determining the correlation coefficients of the energy envelopes, and means for detecting the presence of the sound source from the correlation coefficients. Preferably, the presence of the sound source is detected by including means for averaging the correlation coefficients, establishing an averaged correlation coefficient value, and comparing the correlation coefficient average to the threshold value. The presence of the sound source is detected in one embodiment by combining the correlation coefficients. Preferably, the energy envelope of each of the narrow frequency band components is determined. In one embodiment, the wide-band signal is decomposed by separating it into a plurality of separate narrow frequency band components. In one case, the separate narrow band frequency components are not contiguous.

In another aspect, the invention features a frequency division, energy comparison, source detection signal processing system comprising means for decomposing a wide band signal to a plurality of more narrow frequency band components, and means for comparing those more narrow band components to detect the presence of a sound source. The more narrow frequency band components may be compared by resolving similarities therein, which may be accomplished by means for comparing the signal amplitude of at least some of the more narrow band frequency band components, which itself may be accomplished by means for determining the energy envelopes of those narrow frequency band components and then averaging those energy envelopes.

DISCLOSURE OF PREFERRED EMBODIMENT

Other objects, features and advantages will occur to those skilled in the art from the following description of a preferred embodiment and the accompanying drawings, in which.

Figure 1:
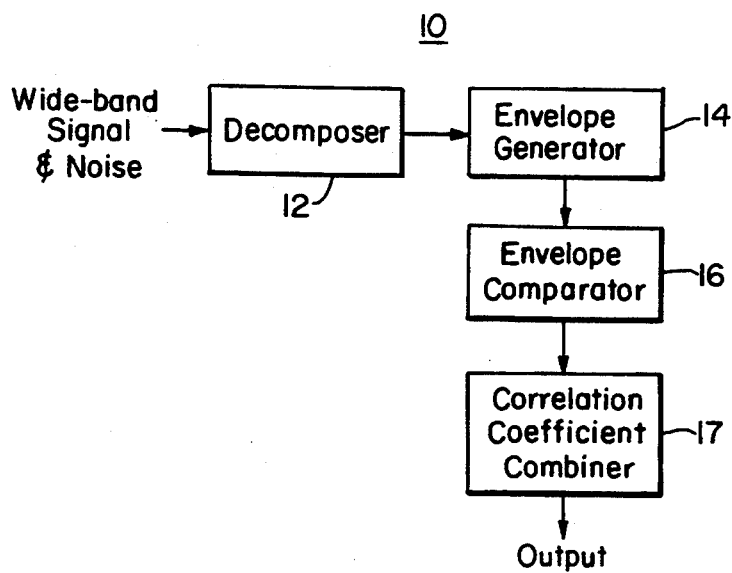
FIG. 1 is a simplified block diagram of the frequency division, energy comparison, source detection signal processing system according to this invention.

There is shown in FIG. 1 frequency division, energy comparison, source detection signal processing system 10 according to this invention for detecting the presence of a source that comprises or contributes to a wide band signal. System 10 includes decomposer 12 for decomposing the wide-band signal into a number of bands, which may be narrow or broad, contiguous, spaced, or overlapping. Preferably, decomposer 12 creates narrow, discrete bands in each of which a single contact or signal source dominates the band spectrum. Envelope generator 14 generates the energy envelope of each of the bands from decomposer 12. Each of those envelopes is then compared to each of the other envelopes in envelope comparator 16. Combiner 17 combines these envelope comparisons. The combination may be tested to see if it meets preestablished criteria indicating the detection of a source contributing to the wide band signal.

Figure 3A:
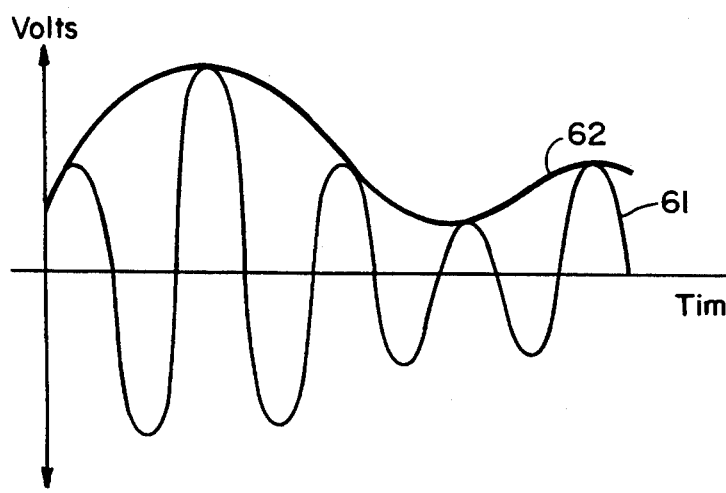
FIGS. 3A and 3B are examples of two signals from the decomposer of FIG. 2, and the energy envelopes generated from those signals by the system of FIG. 2.
Figure 3B:
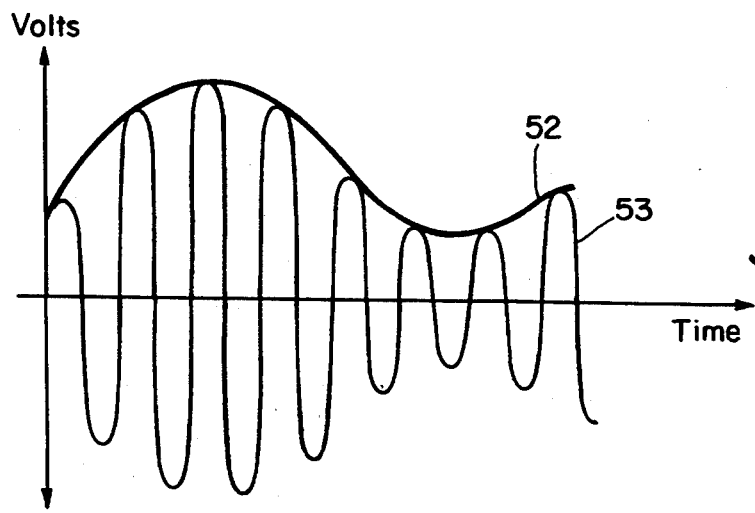
Figure 2:
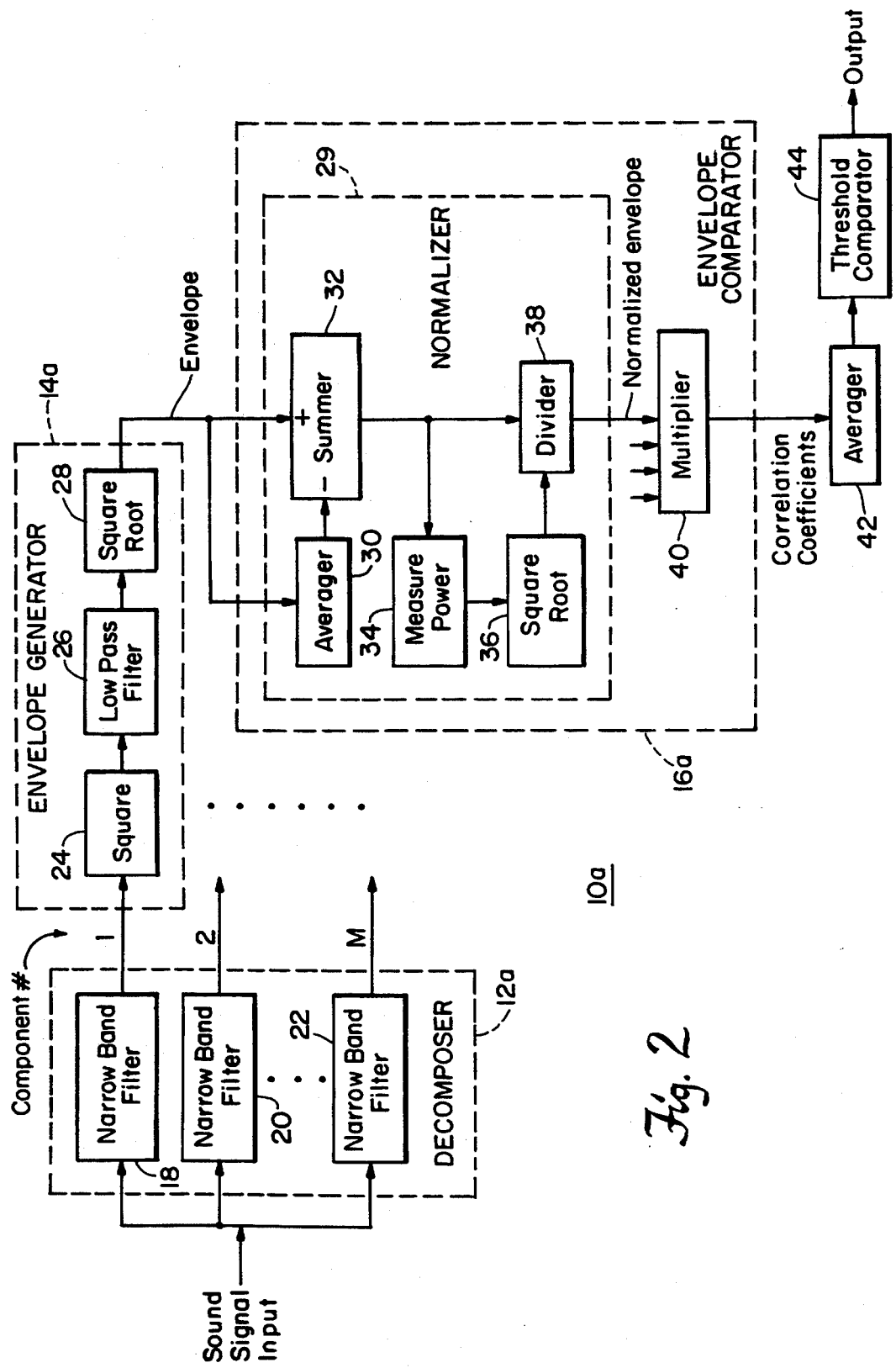
FIG. 2 is a more detailed block diagram of a preferred embodiment of the system of FIG. 1.

A more detailed embodiment of system 10a according to this invention is shown in FIG. 2. Decomposer 12a includes a number of narrow band filters such as filters 18, 20, . . . 22 for creating signal components 1, 2, . . . M, respectively. Preferably, each narrow band filter has the same narrow bandwidth, and the bands do not overlap. It is also preferred that the center frequency of each narrow band filter is an integral multiple of the center frequency of narrow band filter 18 having the lowest center frequency. For example, filter 20 may have a center frequency twice that of filter 18, the next filter three times that center frequency, and so forth, up to the final filter 22, which would have a center frequency of M times the center frequency of filter 18. Examples of outputs of two such filters, for example filters 18 and 20, are shown in FIGS. 3A and 3B; signal 53 from filter 20 has twice the center frequency of signal 61 from filter 18, while envelope 52 resembles—is correlated with—envelope 62.

The series of filtered signals emanating from decomposer 12a enter a number of parallel envelope generators such as generator 14a, FIG. 2. In practice there would be one such envelope generator for each narrow band component 1 through M but only one is shown here for clarity. The envelopes are generated by squaring the narrow band signal in squaring circuit 24, filtering the squared signal with low pass filter 26, and taking the square root of the filtered signal with circuit 28. Envelope 62 of signal 61 and envelope 52 of signal 53 are illustrated in FIGS. 3A and 3B.

The envelope signals then enter envelope comparator 16a, which includes envelope normalizer 29 and multiplier 40. In practice, there would be a normalizer for each envelope; only one is shown for clarity. In normalizer 29, the envelope signal is averaged in circuit 30, and the average is subtracted from the envelope in summer 32. The power of the difference signal is then measured in circuit 34, and its square root taken in circuit 36. The difference signal from summer 32 is then divided by the square root of the power signal in circuit 38 to create a normalized envelope signal, which is then applied to multiplier 40. Multiplier 40 multiplies each normalized envelope by each of the other normalized envelopes from wide band signal components 1 through M to determine the correlation coefficient of each possible pair of normalized envelopes. The correlation coefficient of each envelope with itself always has the value 1, and is not of interest.

The correlation coefficients may then be analyzed to detect the presence of a source that contributes to the wide band signal. This is accomplished by averaging all the correlation coefficients in averager 42, and then comparing that average to a previously determined average threshold value in comparator 44. Thus, the system determines the presence of a source when the average of the correlation coefficients is greater than a predetermined threshold value.

In some instances, it may be advisable to select only some of the frequency ranges from within the 1, 2 ... M frequency bands, particularly when a source that emits in a known band or bands may be present. Alternatively, groups of such frequency ranges may be queried as desired.

The threshold can be determined theoretically in advance. The correlation coefficients all have a value of between $-1$ and $+1$. With only broad band noise as the sound signal input, the statistical expected value of the average of the correlation coefficients is 0. The expected value of the variance of the correlation coefficients can be calculated based on the number of data points making up the normalized envelopes. Accordingly, the mean, variance and thus the standard deviation of a noise signal will be known a priori. This information is all that is necessary for those skilled in the art to determine a correlation coefficient average threshold value that will detect the presence of a source independent of the strength of the source signal in relation to the noise. And, since all of the receiving elements of the receiving array may be used, the signal to noise ratio is increased over the prior art directional detection systems.

Figure 4:
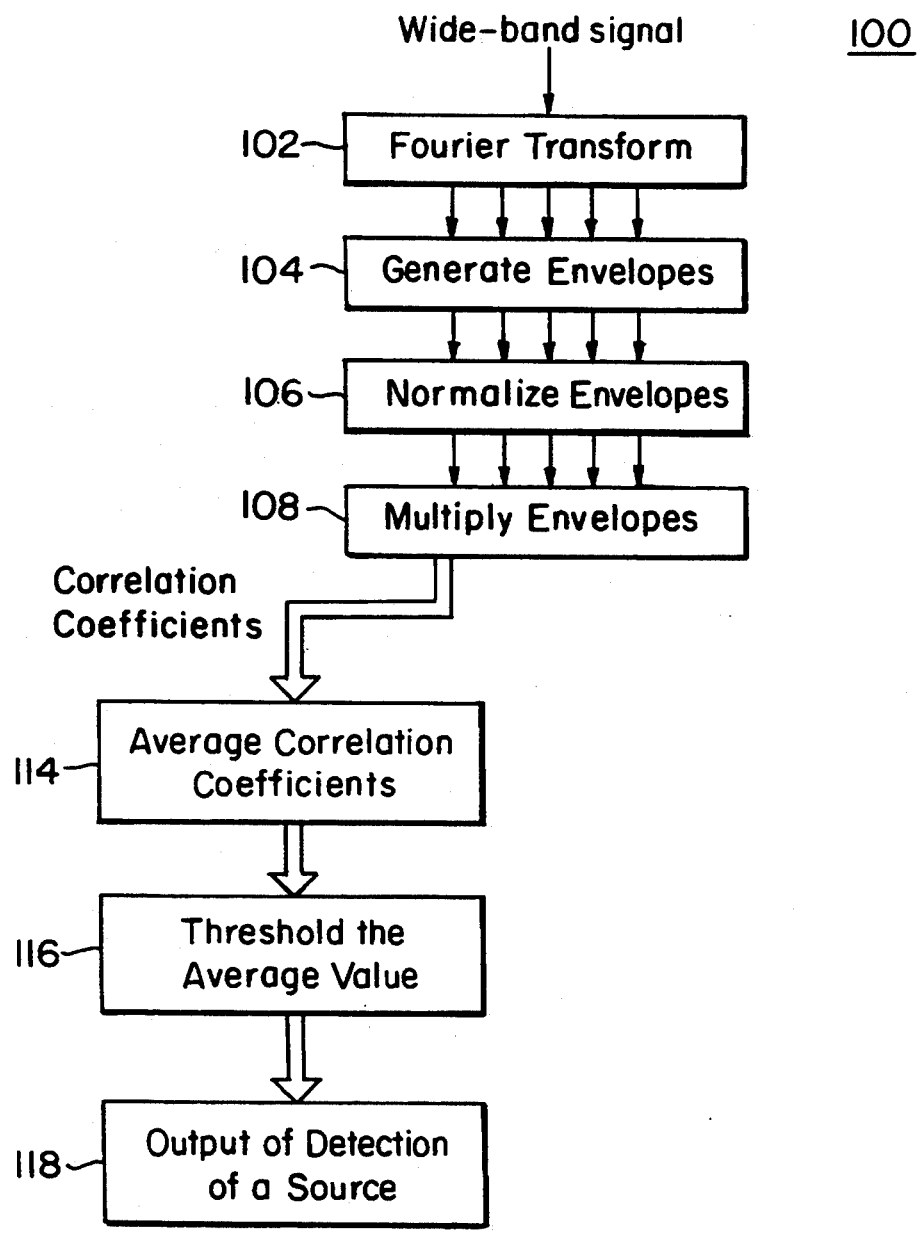
FIG. 4 is a block diagram of a method of detecting a sub-surface ocean contact using the system of this invention.

The use of system 10a for detecting a sub-surface ocean contact is illustrated in FIG. 4. Detection method 100 includes first step 102 in which the wide-band input signal, in this case a sound signal from an undersea receiver, is Fourier transformed. Preferably, the wideband signal is sampled over a time T divided into N time segments of equal length, and each segment is decomposed into M discrete wavelength bands. One discrete Fourier transform is performed on each segment to create $N \times M$ complex coefficients.

At step 104 the envelope of each narrow band component is determined by taking the square root of the sum of the squares of the real and imaginary components of each Fourier coefficient. The result is a matrix of $N \times M$ real coefficients arranged as N rows and M columns. Each envelope is normalized, step 106, by calculating the mean of each column and subtracting the mean from the envelope, calculating the sample variance of each column, taking the square root of the variance, and dividing the difference between the envelope and the column mean by the square root. The system in step 108 then calculates the correlation coefficients of all possible pairs of matrix columns or envelopes by multiplying the pairs of normalized envelopes, resulting in $M \times (M-1)/2$ independent correlation coefficients.

At step 114, the system averages the correlation coefficients, and at step 116 compares the average to a previously established average correlation coefficient threshold value, the choice of which would be apparent to one skilled in the art dependent on the specific situation as described above. At step 116, the system identifies the presence of a source if the average is above the threshold.

The statistical increase in the values of the correlated envelope pairs indicative of undersea contacts are believed to be due to the fact that sound sources typically emit in a number of narrow frequency bands that may be adjacent or not. As the sound waves propagate through the water, they are attenuated similarly, causing the energy envelopes of the detected narrow band frequency signals emanating from a contact to have similar shapes, which results in a high degree of correlation between the envelope pairs of these narrow frequency bands.

It is also known that the emission spectrums of separate undersea contacts often will overlap. However, the system of this invention is able to unambiguously associate sounds at discrete narrow wavelength bands with a single contact, regardless of such overlap, because the system looks for correlations between envelopes of each band and every other band; high correlation between envelopes indicates that the signals in those bands are all from a single contact.

Although the preferred embodiment has been described for detection of undersea contacts this example is not meant to limit the invention; the signal processing system of this invention supplies information heretofore not available in the art of passive wide-band signal reception and analysis. The system can be used in any situation in which it is desired to extract information from a previously undescribed wide-band signal from a source not under the control of the receiver, for example in the analysis of sounds emanating from a machine.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A frequency division, energy comparison, source detection signal processing system, comprising:
   means for decomposing a wide-band signal into a plurality of more narrow frequency band components;
   means for generating the energy envelope of at least some of said more narrow frequency band components;
   means for determining correlation coefficients of the generated energy envelopes;
   means for combining said correlation coefficients;
   means for establishing a combined correlation coefficient threshold value; and
   means for comparing said combined correlation coefficient to said combined correlation coefficient threshold value to detect the presence of a sound source.

2. A frequency division, energy comparison, source detection signal processing system, comprising:
   means for decomposing a wide-band signal into a plurality of more narrow frequency band components;
   means for generating the energy envelope of at least some of said more narrow frequency band components;
   means for determining the correlation coefficients of said energy envelopes;
   means for averaging said correlation coefficients;
   means for establishing an averaged correlation coefficient threshold value; and
   means for comparing the correlation coefficient average to the correlation coefficient threshold value to detect the presence of a sound source.

* * * * *